Figure 1:
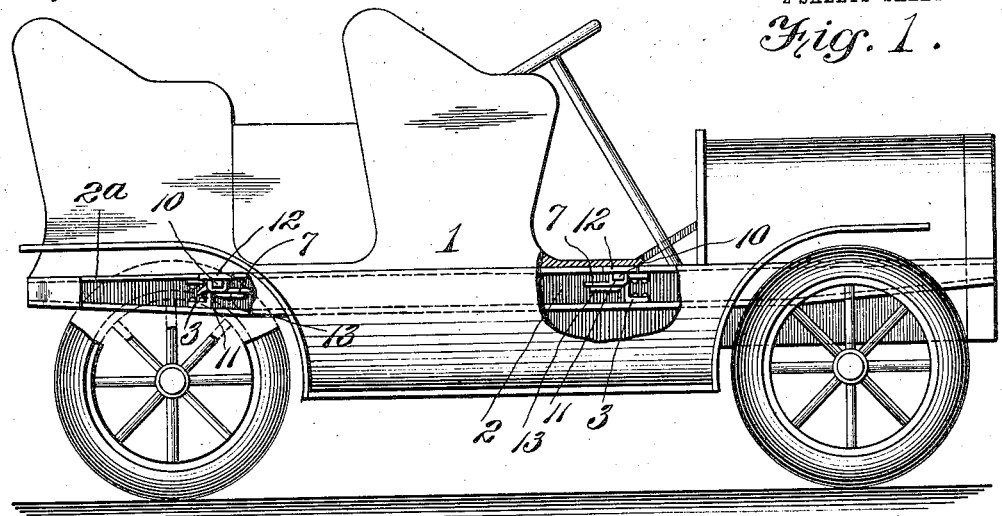

O. B. WIPPLER.
MOTOR VEHICLE.
APPLICATION FILED JULY 3, 1912.

1,064,582.

Patented June 10, 1913.
2 SHEETS—SHEET 1.

Attest:
Chas. A. Becker
Wm. H. Scott

Inventor:
Oswald B. Wippler,
By Ralph Nadeau
Attorney

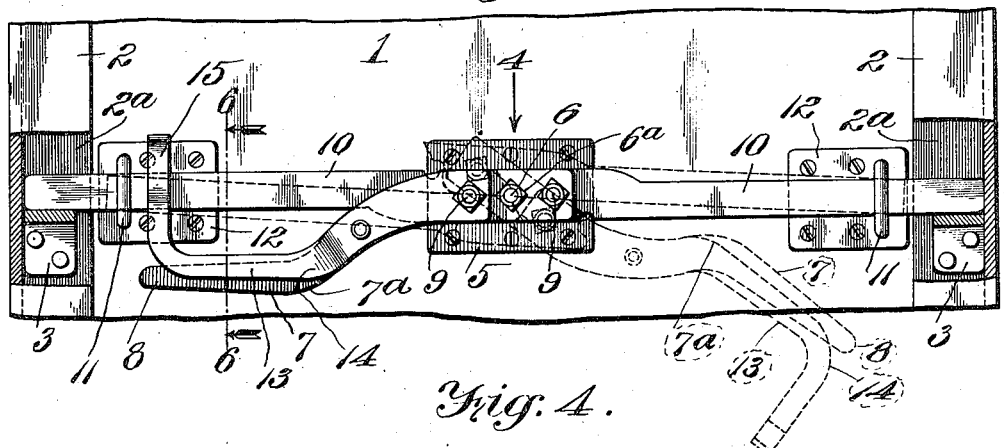
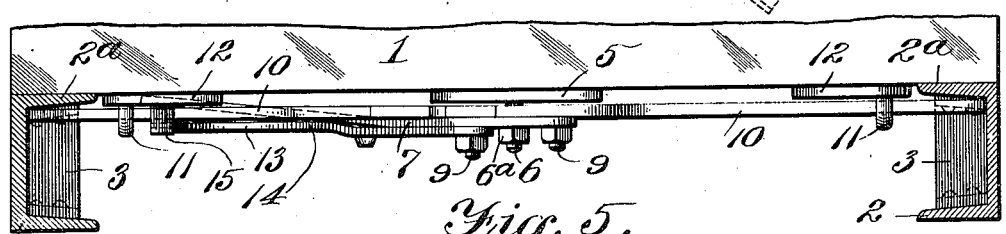
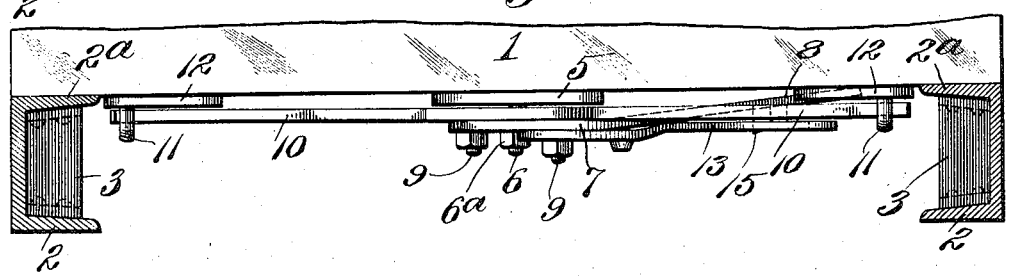
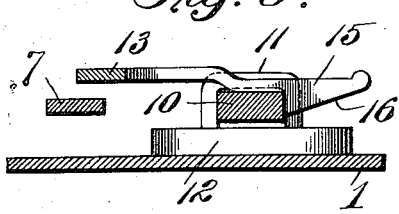
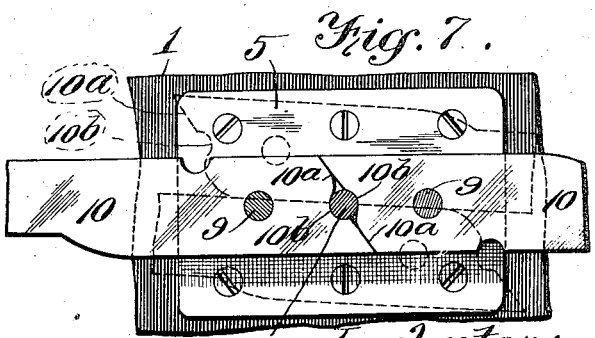

UNITED STATES PATENT OFFICE.

OSWALD B. WIPPLER, OF ST. LOUIS, MISSOURI.

MOTOR-VEHICLE.

1,064,582.

Specification of Letters Patent. Patented June 10, 1913.

Application filed July 3, 1912. Serial No. 707,511.

*To all whom it may concern:*

Be it known that I, OSWALD B. WIPPLER, a citizen of the United States, and a resident of the city of St. Louis, State of Missouri, have invented certain new and useful Improvements in Motor-Vehicles or Automobiles, of which the following is a specification, reference being had to the accompanying drawings, forming a part hereof.

This invention relates generally to motor vehicles, and more particularly to a certain new and useful means or device for releasably or detachably locking the vehicle-body and the chassis or supporting-frame operatively together.

Heretofore, so far as I am aware, the body and chassis of a motor vehicle or automobile have been generally fixedly secured and held together by means of bolts, or other like fastening means, the securing of a body upon a chassis or frame by such means involving considerable labor and expense and the removing of a body from a chassis or frame when so secured being accomplished not only with difficulty, but also at an expenditure of a large amount of time and work. Not only for these reasons, but also because to-day many owners of motor vehicles are desirous of interchangeably employing their cars both for business purposes, such as delivery cars, and for pleasure-riding, means whereby motor-vehicle bodies of different kinds and adapted for different or special purposes may be readily, quickly, easily, and interchangeably operatively secured upon and to a chassis or frame, has been greatly wanted.

The principal object of my invention is, therefore, to provide means whereby a motor-vehicle body may be readily, quickly, and easily removably or detachably secured upon a chassis or frame, and more specifically to arrange on the underside of an automobile body or tonneau one or more simple, comparatively inexpensive, and easily operated devices, each comprising a pair of readily releasable locking-members or bars and a single operating-lever, adapted to releasably engage with the chassis or frame and thereby removably or detachably hold the body and frame operatively together. By the use of my new devices or locking-means, when actuated or operated to locking position and engaging the chassis, the body will be firmly and rigidly secured upon and to the chassis, and, when actuated or operated to unlocking position or out of engagement with the chassis, the body may be easily removed from position thereon and a different body substituted upon the chassis, and hence I am enabled by my new device or locking-means to interchangeably use or combine with a single chassis or frame the body or tonneau of either a touring car, limousine, coupé, roadster, runabout, delivery car, or, in fact, practically any style or type of body or tonneau.

To the above purposes and with the above objects in view, my invention resides in certain novel features of construction, arrangement, and combination of parts, all as hereinafter fully described and afterward pointed out in the claims.

Figure 2:
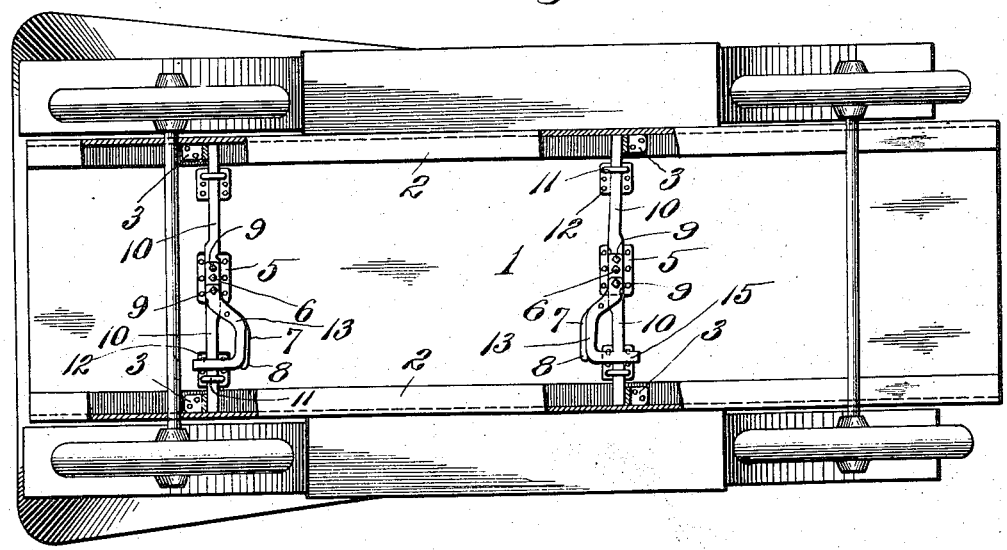

In the drawings—Figure 1 is a side elevational view of an automobile or motor vehicle equipped with my new locking devices, parts of the body of the vehicle being broken away in order to show the location of said locking devices; Fig. 2 is a view looking at the under side of a motor vehicle equipped with my improved locking devices, parts of the chassis and running gear being removed. Fig. 3 is an enlarged view looking against the under side of a portion of a motor vehicle, showing thereon one of my new body attaching and locking devices in locked position in full lines and in unlocked or open position in dotted lines; Fig. 4 is a side elevational view of my new locking device looking in the direction indicated by the arrow 4, Fig. 3, with the side rails of the frame or chassis in section and with the locking-bars in locked position; Fig. 5 is a view similar to Fig. 4, the locking-bars being shown in disengaged or unlocked position; Fig. 6 is an enlarged detail sectional view taken approximately on the line 6—6, Fig. 3; and Fig. 7 is an enlarged detail plan view, partly in section, looking at the under side of the central plate of my new locking device.

Referring by numerals to the accompanying drawings, 1 designates the body or tonneau of a motor vehicle or automobile, the body 1 shown being of the ordinary touring or passenger car type.

2—2 designate the side rails of the vehicle frame or chassis, which side rails are of the usual channel-shape type with their flanges presented inwardly. Fixed in any suitable manner to these rails 2—2 and within the channel thereof, and at determinate points thereon, are brackets or plates 3, which are adapted to form shoulders or abutments against which the ends of the locking bars of my new device are adapted to engage when said bars are in locking position, and thereby prevent the body 1 moving or sliding longitudinally on the chassis or frame-rails 2—2.

On ordinary motor vehicles, I prefer to make use of or employ two of my new locking devices, each comprising a pair of locking-bars, but it will be readily understood that a greater or less number of such pairs of bars might be used, depending, of course, upon the length of the tonneau or chassis.

Each locking device comprises a center plate 5 horizontally fixed and firmly secured in any suitable manner to the under side of the tonneau or body at a point preferably midway between the sides thereof, and firmly mounted in and depending from the center of this plate 5 is a stud or pin 6. Pivotally mounted or journaled adjacent one—its inner—end on the pin or stud 6, and held thereon in any suitable manner, as by means of a nut 6ª, is a horizotally-disposed lever 7, preferably bent or curved outwardly between its ends, as at 7ª, to provide at its outer end portion an operating-handle 8.

Seated or mounted in the inner end of lever 7, and at points equidistant from pivot pin or stud 6, are pins or studs 9—9, and pivotally mounted or journaled upon said pins or studs 9—9, and interposed between the inner end of lever 7 and center plate 5, are the inner ends of transversely-disposed locking bars 10—10. The outer end portions of these bars 10 are mounted to slide freely through loops or keepers 11—11 depending from plates 12—12 fixed to the under side of the vehicle body or tonneau 1 adjacent its side edges and in direct transverse alinement with center plate 5, as shown particularly in Figs. 2 and 3.

Fixed in any suitable manner to the inner end portion of lever 7 is one end of a spring member 13 that extends beneath said lever outwardly toward handle 8, the outer end portion of this spring member 13 being bent preferably at right angles to said handle, as at 14. Formed on the free end of the bent portion 14 of spring member 13 is a hook 15 provided preferably with an inclined upper face 16, this hook 15, when lever 7 is moved to locking position, being adapted to engage the edge of the corresponding bar 10 to hold said lever and therewith bars 10 in locked position. The inclined face 16 of hook 15 permits the latter to readily slide over the said bar 10 when it is being engaged by said hook 15. The length of the locking bars 10—10 is such that, when lever 7 occupies its locking position, as shown in Figs. 2 and 4 and particularly in full lines in Fig. 3, the outer ends of said bars project beyond plates 12 and into the channel, and under and engage with top flange 2ª, of rails 2—2 and bear against at their sides the corrspending brackets or plates 3. When so positioned, the pins or studs 9—9 are in transverse alinement with pin or stud 6, and the parts are thus held in locked position by the engagement of hook 15 behind or with the corresponding bar 10, the outer ends of the locking bars 10 engaging the rails 2—2 and the brackets 3 thereon, and thus the tonneau or body is firmly and rigidly held in proper position on the frame or chassis. When it is desired to detach and remove the body 1, the operator bears downwardly upon the free end of spring member 13 to disengage the hook 15 from said bar 10, after which handle 8 is engaged and lever 7 sidewise swung inwardly in a horizontal plane with the pin or stud 6 as an axis. As this movement of lever 7 takes place, the pins or studs 9—9 seated in the inner end portion thereof are moved around the axis pin or stud 6 into the positions shown by dotted lines in Figs. 3 and 7, the locking bars 10—10 being thereby oppositely retracted or drawn substantially horizontally inwardly toward each other and consequently out of engagement with said rails 2—2 and their brackets 3. When this movement has been accomplished, the locking-bars 10—10 and the other parts of my device occupy the positions shown in Fig. 5, and with said bars 10—10 thus withdrawn from their attaching and locking positions and engagement with rails 2—2, the tonneau or body 1 is free to be lifted off and removed from the frame or chassis.

As shown particularly in Fig. 7, the inner ends of locking-bars 10—10 match and are preferably somewhat oppositely obliquely cut-away, as at 10ª, and provided centrally with a semi-circular recess, as at 10ᵇ, for encircling pivot 6 when bars 10—10 are in locking position, these bars 10—10 being adapted to abut or impinge against each other at their inner ends, and thus remove to a great extent the strain upon pivots 9—9, when they are in locking position.

Locking devices of my construction can be readily combined with practically all forms of tonneaus and frames; can be easily and quickly operated, the locking-bars thereof readily moved into and out of locking position, and provide simple, comparatively inexpensive means whereby not only one special form or style of tonneau or body, but also anyone of a number of different forms or styles of tonneaus or bodies, can be readily combined with a frame or chassis.

By utilizing my invention, it is possible for a motor vehicle owner to have a single chassis and engine and a number of different bodies or tonneaus adapted to fit the said single chassis, and by interchanging said bodies upon the single chassis, the owner has the manifold advantages incident to the use of a variety of types of motor vehicles.

It will be readily understood that minor changes in the size, form, construction and combination of the several parts of my new locking device may be made and substituted for those herein shown and described without departing from the nature and principle of my invention.

Having thus described my invention, what I claim and desire to secure by Letters Patent is:

1. In a device for detachably holding a motor vehicle body to its supporting frame or chassis, a plate adapted to be horizontally applied and fixed to the under side of the vehicle body, a pair of movable locking bars horizontally-disposed relatively to, and movable in a horizontal plane substantially parallel with the plane of, said plate, said bars being adapted to be oppositely projected into and retracted out of, locking engagement with the chassis, a horizontally disposed lever pivotally connected to said plate and to said bars and being sidewise movable in a horizontal plane to one side of, and substantially parallel with, the horizontal planes of said plate and said bars, said bars lying at one end between said lever and plate and said lever being adapted to oppositely project said bars into, and retract said bars out of, locking engagement with said chassis and means adapted to releasably lock said bars in locking position; substantially as described.

2. In a device for detachably holding a motor vehicle body to its supporting frame or chassis, a plate adapted to be horizontally applied and fixed to the under side of the vehicle body, a pair of movable locking bars horizontally-disposed relatively to, and movable in a horizontal plane substantially parallel with the plane of, said plate, said bars being adapted to be oppositely projected into, and retracted out of, locking engagement with the chassis, a horizontally-disposed lever pivotally connected to said plate and to said bars and being sidewise movable in a horizontal plane to one side of, and substantially parallel with, the horizontal planes of said plate and said bars, said bars lying at one end between said lever and plate and said lever being adapted to oppositely project said bars into, and retract said bars out of, locking engagement with said chassis, and a spring-member carried by said lever adapted to detachably engage with one of said bars when said bars are in locking position to releasably lock said bars in such position; substantially as described.

3. In a motor vehicle, the combination with the body and its supporting frame or chassis, of a plate horizontally fixed to the under side of said body, a pair of movable locking bars horizontally-disposed relatively to, and movable in a horizontal plane substantially parallel with the plane of, said plate, said bars being adapted to be oppositely projected into, and retracted out of, locking engagement with said frame or chassis, a horizontally-disposed lever pivotally connected to said plate and to said bars adjacent their inner ends and being sidewise movable in a horizontal plane substantially parallel with the horizontal planes of said plate and said bars, said bars lying at their inner ends between said lever and body and said lever being adapted to oppositely project said bars into, and retract said bars out of, locking engagement with said chassis, keepers fixed to said body for the free ends of said bars and in which said bars at their free ends are slidably movable, and a spring-member carried by said lever adapted to detachably engage with one of said bars when said bars are in locking engagement with said chassis to releasably lock said bars in such position; substantially as described.

4. In a device for detachably locking a motor vehicle body to its supporting-frame or chassis, a plate adapted to be applied and fixed to the under side of the vehicle body, a pair of movable locking bars adapted to be oppositely projected into, and retracted out of, locking engagement with the frame or chassis, said bars being also adapted to abut against each other at their inner ends when in locking position, a lever pivotally connected to said plate and to said bars adapted to oppositely project said bars into, and retract said bars out of, locking engagement with said frame or chassis, said bars lying at their inner ends between said lever and said plate and means adapted to releasably lock said bars in locking position; substantially as described.

In testimony whereof, I have signed my name to this specification, in the presence of two subscribing witnesses.

OSWALD B. WIPPLER.

Witnesses:
 RUTH PETERSON,
 ZELMA PINCUS.